United States Patent [19]
Wiercinski et al.

[11] Patent Number: 5,687,517
[45] Date of Patent: Nov. 18, 1997

[54] SKID-RESISTANT ROOFING UNDERLAYMENT

[75] Inventors: Robert Alan Wiercinski, Lincoln; Robert Francis Jenkins, Wakefield, both of Mass.

[73] Assignee: W. R. Grace & Co.-Conn., New York, N.Y.

[21] Appl. No.: 531,437

[22] Filed: Sep. 21, 1995

[51] Int. Cl.⁶ ........................................................ E04D 5/10
[52] U.S. Cl. .................... 52/177; 52/309.1; 52/783.16; 52/783.17; 52/783.19; 52/796.1; 52/DIG. 16
[58] Field of Search .............................. 52/177, DIG. 16, 52/309.1, 783.11, 783.17, 783.19, 796.1, 783.16; 428/59, 183, 184, 489

[56] References Cited

U.S. PATENT DOCUMENTS

| | | | |
|---|---|---|---|
| 4,567,084 | 1/1986 | Juei Jse | 52/783.11 X |
| 4,595,636 | 6/1986 | Wiercinski et al. | |
| 4,610,902 | 9/1986 | Eastman et al. | |
| 4,757,652 | 7/1988 | Kalkanoglu | 52/DIG. 16 X |
| 4,897,293 | 1/1990 | Thessen | |
| 4,992,315 | 2/1991 | Zicknell et al. | |
| 5,475,952 | 12/1995 | O'Connor | 52/177 |

FOREIGN PATENT DOCUMENTS

| | | |
|---|---|---|
| 96306892 | 11/1996 | European Pat. Off. |
| 3643041 | 4/1988 | Germany |
| 94 07 750.9 | 6/1994 | Germany |
| 6279754 | 3/1993 | Japan |

OTHER PUBLICATIONS

"XF Film", Rochoux International, Inc. entitled, Downstream Products (Sep. 21, 1995).

"Intplus™ (XF Film)" The Inteplast Group entitled: Inteplast's World of Plastic Products (Apr. 1995).

Grace Ice & Water Shield®, "It Can Take Years to Build a Good Reputation" (1995).

"Spec–Data" sheet for Grace Ice & Water Shield® (embossed with slip–resistant coating (Jun. 1995).

"Grace Ice & Water Shield® Helps Prevent Roof Leaks" (Apr. 1996).

Grace Ice & Water Shield® Roofing Membranes, © 1995 W. R. Grace & Co.–Conn.

*Primary Examiner*—Christopher T. Kent
*Attorney, Agent, or Firm*—Craig K. Leon; Kevin S. Lemack; William L. Baker

[57] ABSTRACT

An exemplary skid-resistant roofing underlayment provides a pressure-sensitive membrane attached to a carrier support sheet having at least two different plastic films, the carrier sheet being corrugated with ridges in the machine direction to provide skid resistance when the underlayment is installed on a sloped roof. Especially preferred are corrugated, cross-laminated composites having a polypropylene or high density polyethylene layer co-extruded with a linear low density polyethylene layer. An exemplary method for making the roofing underlayment involves corrugating at least two different plastic film layers to provide a carrier support sheet for a waterproofing membrane adhesive layer.

15 Claims, 2 Drawing Sheets

SKID-RESISTANT ROOFING UNDERLAYMENT

FIELD OF THE INVENTION

The present invention relates to a flexible, sheetlike roofing underlayment, and more particularly to a waterproofing membrane layer attached to a continuous carrier support sheet comprising at least two different plastic films bonded together and corrugated in the machine direction for skid resistance when the waterproofing membrane is adhered onto a sloped roof.

BACKGROUND OF THE INVENTION

It is known in the waterproofing art to combine a preformed waterproofing membrane, such as a rubberized bitumen layer, with a carrier support sheet. The carrier support film may comprise a variety of materials, such as rubber, plastic, and/or metal. The use of metals are desirable, for example, to improve dimensional stability of the film, which is subjected to oil migration from the oil-plasticized bitumen layer. It has also been desirable to employ cross-laminated plastic films, such as high density polyethylene, for improved stability of the carrier support sheet.

Such pre-formed waterproofing membrane laminates are considered "sheet-like" because they are sufficiently flexible that they can be rolled up and transported after manufacture to the job site where they are unrolled and installed on the building surface. This kind of membrane laminate, useful as an underlayment on sloped roofs, is available from W. R. Grace & Co.-Conn., Cambridge, Mass., under the trademark ICE & WATER SHIELD®. The underlayment is applied to the roof deck before installation of the overlayment, which can comprise asphalt shingles, metal roofing, Spanish tiles, slate tiles, or the like. The function of the membrane underlayment is to seal around roofing fasteners and to protect against damage from ice dams and wind-driven rain.

One problem associated with the installation of this type of roofing underlayment is its slipperiness. An applicator needs to walk on the installed membrane without slipping and falling. Thus, a novel roofing underlayment having improved skid resistance, and a method of making the same, are needed.

SUMMARY OF THE INVENTION

In surmounting the disadvantages of the prior art, the present invention provides a novel flexible sheet-like roofing underlayment. An exemplary underlayment comprises a pressure-sensitive waterproofing adhesive membrane layer attached to a carrier support sheet comprising at least two different plastic films which are bonded together and corrugated with ridges in the machine direction to provide skid resistance when installed on a sloped roof. A major face of the membrane layer is exposable upon removal of an optional release sheet for application to a roof deck.

A preferred carrier support sheet comprises at least one layer of linear low density polyethylene or low density polyethylene, and at least one layer of polypropylene or high density polyethylene. Preferred carrier sheets are corrugated with ridges which, when the membrane is installed on a sloped roof, are preferably perpendicular to the direction of slope for the roof, thereby providing vertical skid resistance to foot traffic. In further preferred embodiments, the corrugated carrier sheet comprises at least two laminated, co-extruded multi-layer plastic films, to provide additional strength and dimensional stability. The orientation of each of the plastic films is preferably about 20–70 degrees, and more preferably about 40–50 degrees, with respect to the orientation of the preferred ridge corrugations.

A method of the invention for making the roofing underlayment comprises attaching a waterproofing adhesive membrane layer to a multi-layer plastic carrier support sheet comprising at least two different plastic films, the films being bonded together and corrugated in the machine direction to provide skid resistance when installed on a sloped roof. A preferred method comprises laminating together at least two co-extruded multi-layer plastic films, at least two films of which comprise a layer of linear low density polyethylene or low density polyethylene and a layer of polypropylene or high density polyethylene, whereby the films within each laminate layer has a direction of orientation different from the other; and corrugating said laminated films with ridges in the machine direction and thus in a different direction of orientation from that of the laminated film layers.

DETAILED DESCRIPTION OF EXEMPLARY EMBODIMENTS

Figure 1:
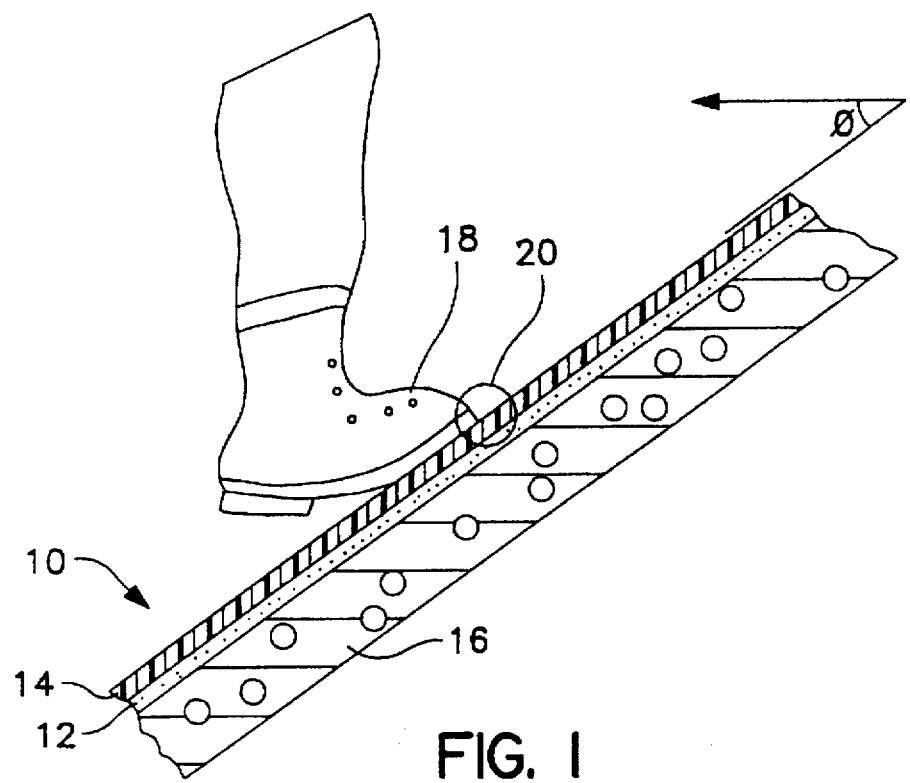
FIG. 1 is a diagram of an exemplary roofing underlayment of the invention, installed upon a sloped roof and subjected to foot traffic.

FIG. 1 shows an exemplary flexible, sheet-like roofing underlayment 10 of the invention wherein a pressure-sensitive membrane adhesive layer 12 is attached to a continuous carrier support sheet 14 comprising at least two plastic film layers bonded together and corrugated with ridges in the machine direction to provide skid resistance on a sloped roof. The film layers of the carrier support sheet 14 can be bonded through co-extrusion, or laminating using an adhesive and/or heat pressing. Preferably, the carrier support sheet 14 comprises a first film layer comprising polypropylene or high density polyethylene, and a second film layer comprising linear low density polyethylene or low density polyethylene. The two films can be coextruded together (adhering to each other integrally upon being formed simultaneously from a liquid resin state) or laminated together (joined integrally using an adhesive and/or heat at a time subsequent to being formed into films from a liquid resin state). Further exemplary embodiments can comprise co-extruded multi-layer plastic films which are then laminated together, and more preferably cross-laminated together.

Figure 3:
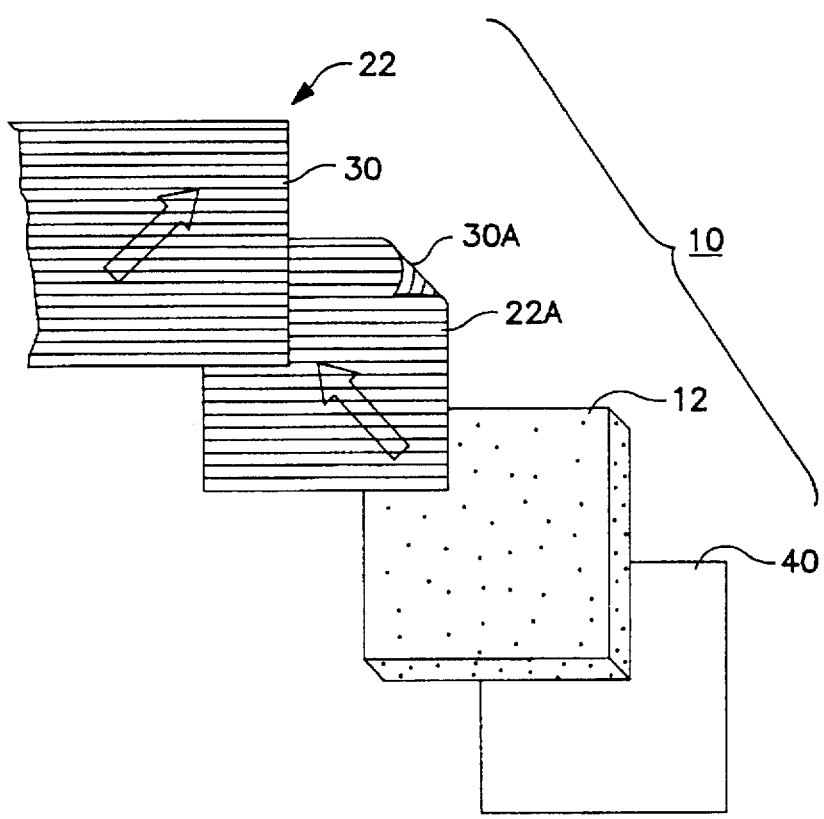
FIG. 3 is an exploded diagram of another exemplary roofing underlayment of the invention.

The underlayment 10 is shown installed upon a sloped roof (at angle θ sloped with respect to horizontal). The carrier sheet 14 is preferably corrugated with ridges which run in a machine direction, such that skidding of foot traffic in the vertical direction is minimized when the underlayment 10 is installed on a sloped roof 16. The underlayment 10 is considered "flexible" and "sheet-like" in contrast to board structures because it 10 can be rolled for transportation to the job site and unrolled as a coherent unit for adhesion of the membrane adhesive layer 12 directly onto a roof or other construction surface. A peelable release sheet (shown only in FIG. 3 at 40), such as waxed or siliconized paper or release-agent-coated plastic film (which does not require corrugation), is customarily used to protect the side of the adhesive layer 12 opposite that of the carrier sheet 14; and removed before installation of the underlayment 10 onto the roof. The adhesive layer 12 is thereby exposed such that it can adhere onto the roof deck 16 and form a waterproofing layer therewith. The carrier sheet 14, after installation, is located uppermost and subject to foot traffic 18 by applicators and other workers at the site.

Further exemplary underlayments 10 comprise a carrier support sheet 14 having two films laminated together and having ridge-shaped corrugations in the machine direction, each of the films having a direction of orientation about 20–70 degrees, and more preferably about 40–50 degrees (and therefore said to be "cross-laminated"), with respect to said ridge-shaped corrugations. Other exemplary underlayments 10 can comprise a carrier support sheet 14 having at least three plastic film layers, or more. For example, an exemplary carrier sheet 14 may comprise a film of polypropylene or high density polyethylene which is laminated or preferably coextruded between two linear low density polyethylene or low density polyethylene film layers. A linear low density polyethylene or low density polyethylene layer is preferably located outermost of the carrier sheet 14 such that, when corrugated with ridges and installed on a sloped roof, a soft, skid resistant surface is provided to foot traffic.

Still further exemplary underlayments 10 may comprise a carrier support sheet 14 having at least four plastic film layers. One exemplary multi-layer carrier sheet 14 can comprise two sets of oriented plastic films, preferably about 20–70 degrees, and more preferably about 40–50 degrees (e.g., cross-laminated) with respect to the machine direction, each film comprising a layer of linear low density polyethylene or low density polyethylene and a layer of polypropylene or high density polyethylene. Ridge-shaped corrugations which are formed in the machine direction can therefore have a direction of orientation about 20–70 degrees, and more preferably 40–50 degrees, relative to the orientation of each of the laminated (and preferably cross-laminated) films.

A method of the invention for forming an exemplary roofing underlayment 10 comprises attaching a waterproofing adhesive membrane layer 12, using rubberized bitumens as known in the waterproofing art, to a continuous multi-layer carrier support sheet 14 comprising at least two plastic films corrugated to provide skid resistance when the underlayment 10 is installed on a sloped roof. Preferably, one of the plastic films comprises a linear low density polyethylene or low density polyethylene layer, and a second of the films comprises polypropylene or high density polyethylene.

The carrier sheet 14 may be corrugated with ridges by compressing it through the nip of opposed laminating or calendar rollers which are preferably heated. At least one of the rollers is embossed, etched, or otherwise patterned to provide ridges in the machine direction. The corrugation may be done after the carrier sheet 14 has been extrusion-formed, while the sheet is still in a thermally softened state; or after the sheet 14 is formed by laminating two or more films (e.g., co-extruded multi-layer films) together. The carrier sheet 14 may also be corrugated, such as by using heated rollers, at least one of which an embossing roller, during the act of laminating two plastic films together.

While it may appear, in view of the present invention, that ridge-shaped corrugations are only needed on the outermost face of the underlayment 10, for engaging foot traffic on a sloped roof (e.g., FIG. 1), the inventors believe that providing ridge-shaped corrugations on both sides of the carrier support sheet 14 may be preferred (as shown in the exploded view of FIG. 3), especially where film layers 22 and 22A each have orientations about 20–70, more preferably 30–60 degrees, and most preferably about 40–50 degrees, relative to the direction of the ridges 30 and 30A, which will most preferably be perpendicular to the slope of the roof when the underlayment 10 is installed on a sloped roof (e.g., FIG. 1). The use of different (and preferably cross-) directions of orientation in the two plastic films 22/22A and in the corrugations 30/30A is believed to provide strength to support the skid resisting function of exemplary underlayments of the invention, as well as to provide dimensional stability to the underlayment structure. As previously mentioned, a linear low density polyethylene or low density polyethylene film layer (having ridge-shaped corrugations) will preferably be located topmost (or outermost) of the layers in the carrier sheet 14 and will be the softer material that will provide improved slip resistance to foot traffic; while the polypropylene or high density polyethylene film layer will have a higher modulus of elasticity and preferably be located immediately beneath to provide dimensional stability and strength to the underlayment laminate structure 14. Polypropylene is preferred for the inner layer because it is believed to provide better resistance than high density polyethylene to oil migration from the oil-plasticized rubber bitumen adhesive layer 12, and also provides better dimensional stability.

In further exemplary underlayments 10, the carrier support sheet 14 can comprise at least two different polymers selected from the group consisting of high density polyethylene, linear low density polyethylene, low density polyethylene, medium density polyethylene, polypropylene, polyethylene terephthalate, polyamide, polyvinyl chloride, polyvinylidene chloride, polystyrene, and ionomer resins. For purposes of definition herein, "high density polyethylene" shall mean and refer to polyethylene compositions having a density of 0.941 g/cc. or higher; "medium density polyethylene shall mean and refer to 0.926–0.940 g/cc.; and "low density polyethylene" (including linear low density polyethylene) shall mean and refer to the density range of 0.90–0.925 g/cc (ASTM D-1248).

Figure 2:
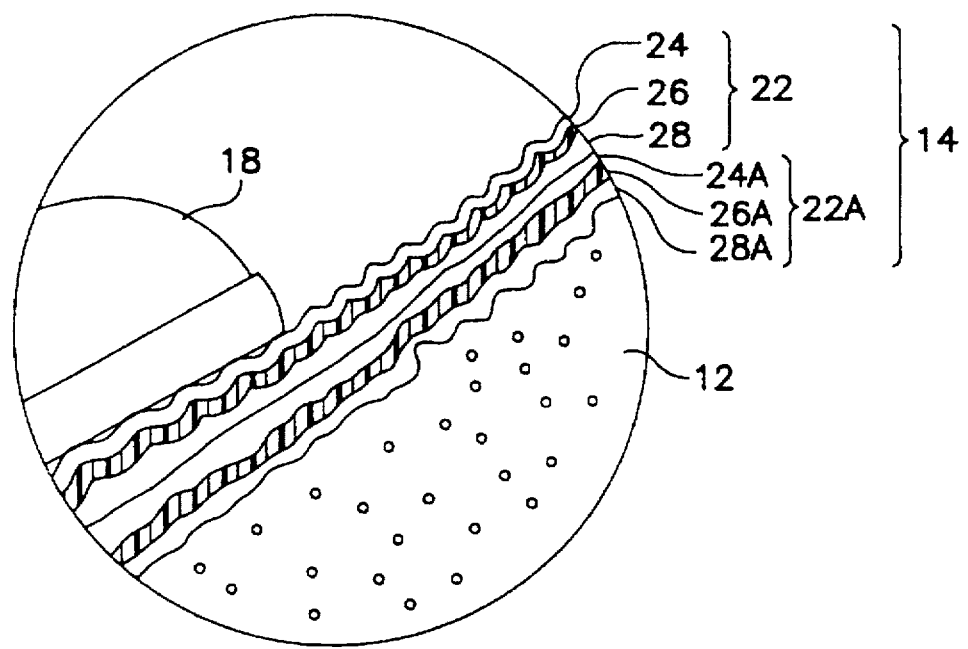
FIG. 2 is an enlarged diagram of another exemplary roofing underlayment of the invention.

FIG. 2 illustrates a preferred roofing underlayment 10 of the invention in which the carrier support sheet 14 comprises at least two multi-layer plastic films 22 and 22A, each film comprising at least three plastic layers (24/26/28; 24A/26A/28A). Films 22 and 22A preferably comprise at least one polypropylene or high density polyethylene layer, and at least one linear low density polyethylene or low density polyethylene layer (and preferably a linear low density polyethylene layer on either side of the polypropylene or high density polyethylene layer). A preferred method for making this exemplary carrier sheet comprises co-extruding three concentric plastic layers 24/26/28 and 24A/26A/28A to form a tubular film, preferably a polypropylene or high density polyethylene layer between two linear low density polyethylene or low density polyethylene layers. During co-extrusion, the concentric layers are pulled away from the die at an elevated temperature and, after being "set" in the stretched configuration by cooling the material, are thus "oriented," or stressed in the machine direction. Next, the co-extruded tubular films are spirally cut at a preferred angle of about 20–70 degrees, and more preferably of about 40–50 degrees, with respect to the machine direction of the (tubular) film, to form a continuous film having an edge-toedge width; cross-laminating two such continuous films together (whereby one layer has an orientation that is angled differently than another layer); and corrugating said laminated films with ridges running in the machine direction, whereby the ridges are aligned preferably about 20–70 degrees, and more preferably 40–50 degrees, relative to each of the laminated films.

Thus, in preferred embodiments of the invention, two polyolefin composites 22 and 22A are cross-laminated such that the orientation of one film 22 is approximately perpendicular to the other 22A. The cross-laminated film 22/22A is then corrugated with ridges oriented about 40–50 degrees with respect to the orientations of the cross-laminated films of the carrier 14. This preferred embodiment is believed to provide excellent strength and dimensional stability to the overall underlayment 10 structure when it is installed on a sloped roof and subjected to foot traffic.

Known tie layer adhesives can be used for adhering together co-extruded films 22 and 22A together. Resins sold under the tradenames PLEXAR® from Quantum and BYNELυ from DuPont may be used.

Generally, waterproofing membrane composition layers 12 are well-known in the industry. Pressure-sensitive rubberized bitumen (asphalt) adhesives which do not require heat for application to roof decks are preferred. The bituminous adhesive composition 12 comprises a mixture of (a) a bituminous material and (b) natural or synthetic polymer, preferably a rubber or other elastomer polymer. The term "bituminous material" as used herein includes compositions containing asphalt, tar such as coal tar, or pitch. The bituminous adhesive may be reinforced with fibers and/or particulate fillers. In addition to any oils normally present in the bitumen, the adhesive composition may also contain a conventional extender component such as an aromatic oil. As aforementioned, the preferred polymer component is rubber which may be virgin rubber or a synthetic rubber (e.g., SBS, SBR) blended into the bitumen, and preferably extender oil at an elevated temperature, to form a smooth mix. The bituminous adhesive layer 12, at least at its surface remote from the carrier support sheet 14 is, as mentioned, preferably pressure-sensitive and tacky at normal ambient temperature in order that it be self-adhesive to the substrate surface (e.g., roof deck). The bituminous layer 12 serves to form a continuous waterproofing layer which is elastic and self-sealing against punctures and around nails or other roof fasteners at high and low temperatures. Synthetic adhesives, such as butyl adhesives, are also known and are contemplated for use as the waterproofing adhesive membrane layer 12.

The thickness of the waterproofing membrane adhesive layer 12 is preferably 5–100 mils thick, and more preferably about 10–60 mils thick.

The method for forming the roofing underlayment 10 generally comprises forming the waterproofing adhesive layer 12 by coating a release sheet, allowing the adhesive composition to cool, and laminating the adhesive layer 12 to the carrier support sheet 14, as known in the art. It is possible to coat the adhesive layer first directly onto the carrier support sheet 14.

Preferably, the total transverse thickness of the carrier support sheet 14 is in the range of 0.2–20 mils, and more preferably in the range of 0.5–10.0 mils depending upon the film materials chosen 22. In a preferred carrier sheet layer 14 which comprises, for example, at least one polypropylene (PP) layer sandwiched between two linear low density (LLDPE) or low density polyethylene (LDPE) layers, the ratio of a single layer of PP to a single layer of polyethylene thickness is preferably about 2:1–10:1, and more preferably about 5:1. These measurements can be based upon the average thicknesses taken, for example, at the thickest areas of a corrugated carrier support sheet 14.

In further exemplary underlayments 10, the carrier sheet 22 can comprise at least two different polymers selected from the group consisting of high density polyethylene, low density polyethylene, linear low density polyethylene, polypropylene, polyethylene terephthalate, polyamide, polyvinyl chloride, polyvinylidene chloride, polystyrene, and ionomer resin.

Figure 4:
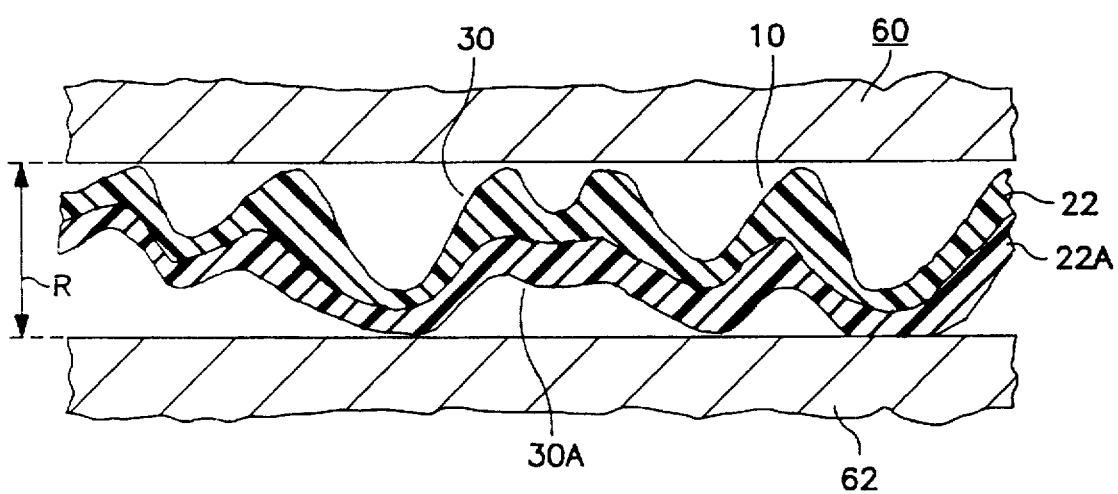
FIG. 4 is an illustration of an exemplary corrugated roofing underlayment of the present invention held between two glass plates.

As shown in FIG. 4, an exemplary roofing underlayment 10 comprises ridge shaped corrugations 30 and 30A. The average ridge height R (of the peak) measurement can be ascertained by placing a square foot section of the underlayment 10 between two square foot sections of quarter-inch thick glass plates, designated as at 60 and 62. Preferably, the ridge height R should be between 1.25–20, more preferably 1.25–10, and most preferably between 1.25–5.0, times the average transverse film thickness of the carrier support sheet 14 which should preferably be determined by measuring the 14 before it is corrugated. Preferably, the ridge-shaped corrugations are non-uniform in size and lateral distance between ridges. An exemplary carrier sheet may comprise at least 5, and more preferably at least 15 ridges per lineal inch, and preferably less than 75, and more preferably less than 25 ridges per lineal inch. Ridges are defined as contact points on the upper or lower glass plates when the corrugated sheet 14 is placed therebetween.

In the roofing underlayments 10 of the invention, at least the outer major face of the continuous carrier sheet 14, and more preferably both opposite faces, comprise ridge-shaped corrugations throughout the continuous surface of the sheet 14. The ridges 30 and 30A are preferably created by compressing the carrier sheet 14 in a thermally softened state between two opposed rollers which have corresponding ridge-creating surfaces. The carrier support sheet 14 film is preferably corrugated using at least one steel roller. For example, a heated embossed steel roller in nipped rolling contact with a rubber roller can be used to corrugate the carrier support sheet 14 in the machine direction, such that when the underlayment is assembled and adhered to the roof deck, the ridges run horizontally.

Further exemplary carrier support sheets 14 comprise an outermost layer having a coating to minimize skidding of foot traffic further, the skid resistant coating comprising a material having a lower Young's modulus of elasticity than the outermost film layer material of the carrier sheet 14. The optional skid resistant coating comprises a resin such as atactic polypropylene, polyethylene vinyl acetate, polyvinyl acetate, polyethylene, ethylene-propylene co-polymer. The coating can optionally contain a plasticizer such as napthenic or aliphatic oil; and/or a tackifier such as a $C_5$ or $C_9$ hydrocarbon resin, a mixed $C_5$ and $C_9$ hydrocarbon resin, a rosin ester, a coumarone-indene resin, or a polyterpene.

Further exemplary roofing underlayments 10 comprise a rubberized bitumen (asphalt) 14 comprising an oil plasticizer and an oil barrier material layer between the continuous carrier film 14 and rubberized bitumen layer 14. The oil barrier material can comprise polyvinylidene chloride, polyethylene terephthalate, polyamide, polyvinyl acetate, and polyacrylonitrile.

Further exemplary carrier films 14 may further comprise pigments (e.g., titanium dioxide, carbon black); light absorbers (e.g., benzotriazoles); light stabilizers (e.g., hindered mines, benzophenones); antioxidants (e.g., hindered phenols); fillers (e.g., calcium carbonate, silica); plasticizers (e.g., napthenic or aliphatic oil); rheological additives, or mixtures thereof.

Accordingly, preferred method for making roofing underlayments comprises co-extruding a multi-layer plastic tubular film comprising a layer of polypropylene between two layers of linear low density polyethylene, spiral cutting said film to obtain a continuous film having an orientation of about 20–70 degrees, and more preferably about 40–50 degrees, with respect to the machine-direction of the film (in other words, the direction of the cut edges); laminating two such co-extruded films together such that their directions of orientation do not coincide; corrugating said laminated films; and attaching a waterproofing adhesive layer to said films which are operative as a carrier support layer. The laminated films are preferably corrugated in the machine direction (in other words, in the direction of the cut edges).

The foregoing exemplary embodiments are provided for illustrative purposes only, and are not intended to limit the scope of the invention.

We claim:

1. A flexible sheet-like roofing underlayment comprising: a pressure-sensitive waterproofing adhesive layer comprising a material selected from the group of rubber bituminous material and synthetic material, said waterproofing adhesive layer being attached to a continuous multi-layer carrier support sheet on a major face thereof, said carrier support sheet comprising corrugations of at least 5 ridges per lineal inch and at least four film layers wherein a first film layer has a first direction of orientation and wherein another film layer has a second direction of orientation different from said first direction of orientation, at least one film layer of said at least four film layers being located outermost of said layers, said ridges being aligned in a machine direction of said carrier support sheet, such that, when installed in a direction perpendicular to the direction of roof slope, said ridges are operative to minimize skidding of foot traffic on the underlayment, each of said at least four film layers having a direction of orientation about 40–50 degrees from the direction of said ridges, said carrier support sheet having an average thickness and said ridges having a height of 1.25–20 times the average thickness of said carrier support sheet; and said carrier support sheet, on a major face opposite said waterproofing adhesive layer, further comprising a coating having a lower Young's modulus of elasticity than the outermost of said at least four film layers of said carrier support sheet.

2. The underlayment of claim 1 wherein said carrier support sheet comprises at least one layer comprising linear low density polyethylene or low density polyethylene, and at least one layer comprising polypropylene or high density polyethylene and a layer of linear low density polyethylene.

3. The underlayment of claim 2 wherein said carrier support sheet comprises a layer of polypropylene and a layer of linear low density polyethylene.

4. The underlayment of claim 1 wherein, in said carrier support sheet, at least two of said at least four film layers are oriented in a first direction, and at least two of said at least four film layers are oriented in a second direction different from said first direction.

5. The underlayment of claim 4 wherein said at least two layers oriented in said first direction comprise a first layer of linear low density polyethylene or low density polyethylene and a second layer comprising polypropylene or high density polyethylene, and said at least two layers oriented in said second direction are comprised of one linear low density polyethylene layer or low density polyethylene and a second layer comprising polypropylene or high density polyethylene.

6. The underlayment of claim 5 wherein said carrier support sheet comprises at least one linear low density polyethylene or low density polyethylene layer between layers comprising polypropylene or high density polyethylene.

7. The underlayment of claim 6 wherein said carrier support sheet has at least one outermost face comprising linear low density polyethylene or low density polyethylene.

8. The underlayment of claim 1 wherein said at least two said film layers are adhered together by a tie layer.

9. The underlayment of claim 1 wherein said carrier support sheet is formed using at least one co-extruded multi-layer plastic film.

10. The underlayment of claim 1 wherein said coating comprises a resin selected from the group consisting of atactic polypropylene, polyethylene vinyl acetate, polyvinyl acetate, polyethylene, and ethylene-propylene co-polymer.

11. The underlayment of claim 1 wherein said underlayment comprises at least 15 ridges per lineal inch.

12. A combination comprising the underlayment of claim 1 and a rooftop, wherein said waterproofing adhesive layer is adhered to said rooftop.

13. A method for fabricating a roofing underlayment comprising attaching a pressure-sensitive waterproofing adhesive layer, comprising a material selected from a rubber bitumen and synthetic material, to a carrier support sheet on a major face thereof, said carrier support sheet comprising at least four film layers and having corrugations of at least 5 ridges per lineal inch, at least one of said at least four film layers having a first direction of orientation and another of said at least four film layers having a second direction of orientation different from said first direction of orientation, at least one film layer of said at least four film layers being located outermost of said layers, said sheet having ridge-shaped corrugations in a machine direction, such that when installed on a roof-top perpendicular to the roof slope, said ridge-shaped corrugations are operative to minimize skidding of foot traffic on said underlayment, said at least four film layers each having a direction of orientation about 40–50 degrees from the direction of said ridge-shaped corrugations, and said carrier support sheet, on a major face opposite said waterproofing adhesive layer, further comprising a coating having a lower Young's modulus of elasticity than the outermost of said at least four film layers of said carrier support sheet.

14. The method of claim 13 wherein said step of attaching said waterproofing adhesive layer comprises attaching a carrier support sheet having two co-extruded multi-layer plastic film laminates cross-laminated together and comprising at least one linear low density polyethylene layer or low density polyethylene layer and at least one polypropylene layer or high density polyethylene layer coextruded together.

15. The method of claim 13 wherein said coating comprises a resin selected from the group consisting of atactic polypropylene, polyethylene vinyl acetate, polyvinyl acetate, polyethylene, and ethylene-propylene co-polymer.

\* \* \* \* \*